United States Patent Office 3,736,236
Patented May 29, 1973

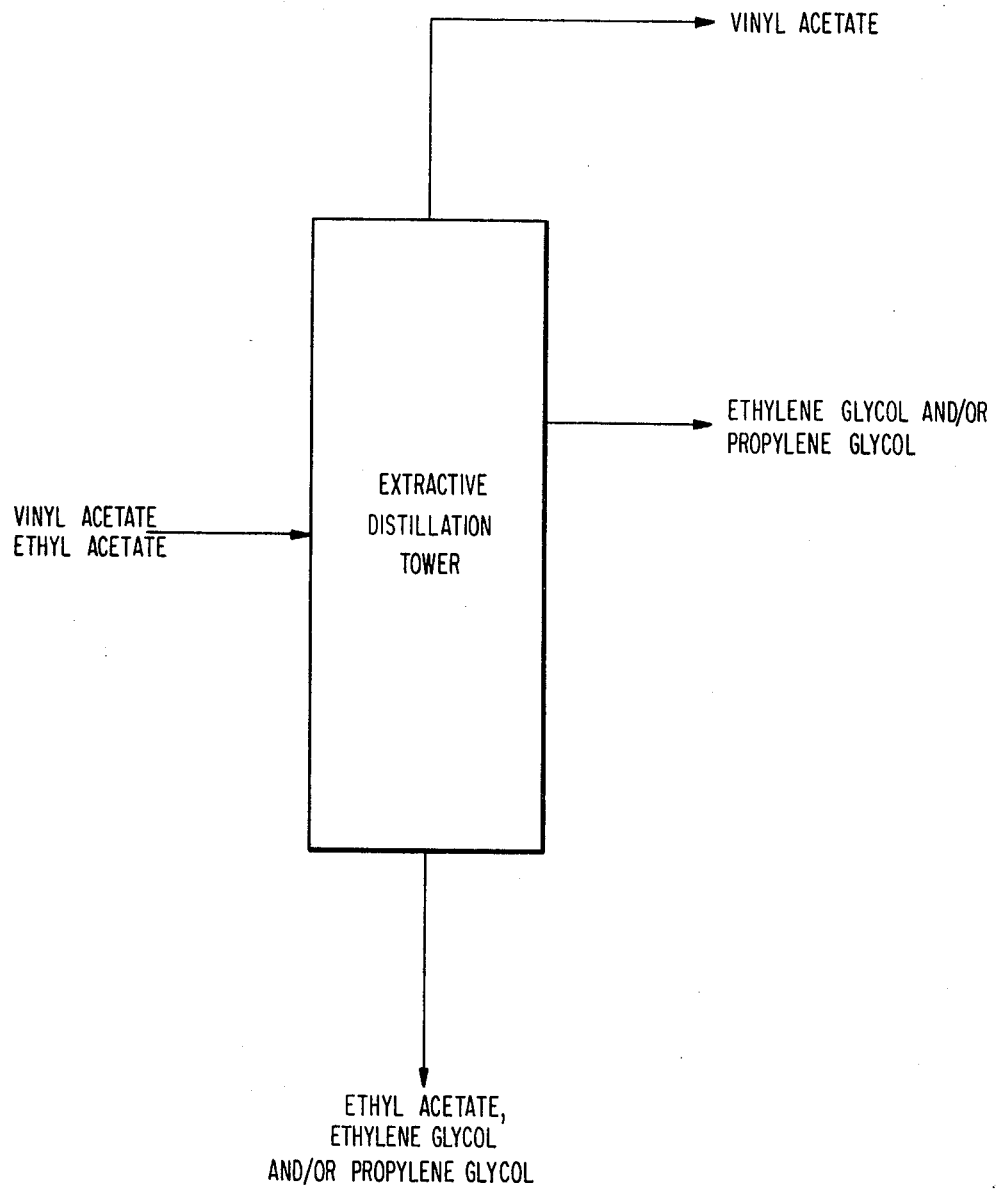

3,736,236
METHOD OF SEPARATING VINYL ACETATE FROM LIQUID MIXTURES BY EXTRACTIVE DISTILLATION WITH A GLYCOL
Lucio di Fiore, Milan, Claudio Divo, Saronno, and Marcello Ghirga, Bresso, Italy, assignors to Societá Italiana Resine S.p.A., Milan, Italy
Filed June 10, 1971, Ser. No. 151,948
Claims priority, application Italy, July 1, 1970, 26,852/70
Int. Cl. B01d 3/40; C07c 67/06
U.S. Cl. 203—51    7 Claims

ABSTRACT OF THE DISCLOSURE

Vinyl acetate is separated from mixtures with ethyl acetate by ethylene glycol and/or propylene glycol, introduced to a distillation column above the feed point of the mixture, and with a reflux ratio of 2 to 7 and a ratio vinyl acetate to glycol of 0.03:1 to 2:1.

---

The present invention relates to the preparation of vinyl acetate by catalytically oxidising ethylene in the presence of acetic acid; more particularly it relates to the separation of the vinyl acetate from the normally liquid products of the reaction.

Accordinng to a known method, vinyl acetate is produced from ethylene and acetic acid by means of an oxidation reaction using palladium salts as a catalyst.

Such processes are normalily carried out in the presence of an oxidation-reduction system.

More particularly, ethylene oxygen, or gases containing molecular oxygen, are fed into a solution or suspension in acetic acid of salts of palladium, of copper, of alkaline or alkaline earth metals; high pressures are used, normally of 20 to 70 kg./sq.cm., and temperatures ranging from 50° to approx. 200° C.

Then, the normally liquid products comprising unchanged acetic acid, water, more or less large quantities of acetaldehyde, together with vinyl acetate, are separated from the gaseous stream emerging from the oxidation reactor. Also present in the liquid products of reaction are by-products consisting of substances lighter than vinyl acetate, particularly methyl acetate, and heavier than vinyl acetate, particularly ethyl acetate, which render the separation process extremely difficult.

Accordinng to one technique, acetic acid and a considerable part of the water are separated as bottom products by distillation from such mixtures. Such acid is recycled to the oxidation reactor after its has been concentrated.

The top products of distillation are then subjected to dehydration treatments and separation of the lighter products from the vinyl acetate.

Thus is left a residue consisting essentially of vinyl acetate and ethyl acetate.

According to another technique, distillation is employed to separate acetic acid as a bottom product from the liquid reaction mixture which comprises vinyl acetate, after which acetaldehyde is separated as a top product from the distillate.

The residue is then cooled which separates off an aqueous phase and an organic phase.

Vinyl acetate is separated from the aqueous phase, while the organic phase is subjected to dehydration and separation of the light compounds which are present.

In this case, too, a residue is obtained which is comprises of vinyl acetate and heavier products, principally ethyl acetate.

The separation of vinyl acetate from such residual products presents various difficulties, particularly on account of the very low levels of relative volatility in the constituents of the mixture. Thus, even when using fractionation columns with a very large number of trays and working with high reflux ratios, progress is still not completely reliable over a period of time. Furthermore, such a fractionation system renders the process of preparing vinyl acetate economically uninteresting.

Similar problems arise in the separation of vinyl acetate from the products of reaction obtained in processes in which ethylene is oxidised in the presence of catalysts consisting essentially of metallic palladium, or in processes carried out in the vapour phase, in which ethylene, acetic acid and the oxidising gas are fed over catalysts consisting of rare metals or their oxides or salts.

It has now been found possible to eliminate the drawbacks described and obtained vinyl acetate from the normally liquid products of the catalytic oxidation of ethylene in a simple and economically favourable manner.

The process according to the present invention consists essentially in subjecting the liquid mixtures which contain vinyl acetate and heavier products, particularly ethyl acetate, to extractive distillation in the presence of ethylene glycol and/or propylene glycol.

More particularly, according to the method of the present invention, the liquid mixture comprising vinyl acetate and ethyl acetate is supplied at a point part way between the top and the base of a distillation column. At a point on the column part way between that of introduction of the mixture which is subject to fractionation and the top, ethylene glycol and/or propylene glycol is introduced.

Thus, vinyl acetate which is substantially bereft of other products is separated at the top of the column while the byproducts, principally ethyl acetate, together with the glycol supplied, are recovered at the bottom of the tower.

The drawing represents a schematic illustration of one embodiments of the process of the present invention.

The method of the present invention allows the separation of vinyl acetate in columns with a small number of trays, operating at low reflux ratios, with obvious advantages from the economic point of view.

Furthermore, the vinyl acetate recovered is of a purity such as to render it suitable for all the uses for which such a product is intended.

Thus, according to the process of the present invention, from the normally liquid product of the catalytic reaction of ethylene in the presence of acetic acid, it is possible to separate first the unaltered acid by distillation as a bottom product, while from the distillate acetaldehyde is separated as a top product.

The residue of distillation is in this way separated into an aqueous phase and an organic phase.

This latter phase is subjected to dehydration treatment and separation of the light products from vinyl acetate. According to another embodiment, it is possible to separate, from the liquid products of the catalytic oxidation of ethylene, acetic acid together with most of the water, while the distillate which is thus obtained is subjected to treatments of dehydration and separation of the light products.

In any case, a residual mixture is obtained which consists substantially of vinyl acetate and ethyl acetate and this mixture is then subjected to fractionation.

The mixtures which are subjected to the distillation process according to the present invention can also be obtained by the process described in our copending U.S. patent application Ser. No. 154,374, filed June 18, 1971, according to which, from the liquid mixtures which essentially comprise vinyl acetate, methyl acetate, ethyl acetate, water and possibly acetaldehyde, distillation is used to separate the lighter products from vinyl acetate as top products in an appropriate fractionation column, while the water is separated as a lateral stream from the column itself.

In this case, too, a mixture consisting of substantially vinyl acetate and ethyl acetate is obtained as a bottom product.

In carrying out the process of the present invention, such mixtures are supplied at a point partway between the top and the base of a distillation column having from 30 to 50 theoretical trays.

For this purpose, tray columns or filling columns may be used.

In particular, the supply is made at a point on the column between the fifth and the thirtieth theoretical tray.

Furthermore, according to the process of the present invention, at a point part way between that of the point of supply of the mixture and the top of the column, ethylene glycol and/or propylene glycol is supplied in a quantity such that the ratio by weight of vinyl acetate/ethylene glycol and/or propylene glycol supplied is between 0.03:1 and 2:1.

Preferably, the glycol is supplied to the part of the column between the twentieth and the fortieth theoretical tray. By maintaining reflux ratios on the order of 2 to 7, it is possible to separate vinyl acetate at the top of the column in virtually pure form (purity better than 99.9%).

At the base, the by-products are recovered, mainly ethyl acetate, together with the acetic acid supplied.

The process according to the present invention has been described with particular reference to the separation of mixtures which are obtained in the separation of normally liquid products of the catalytic oxidation of ethylene in the presence of acetic acid.

It is however obvious that such a process is also applicable to mixtures comprising vinyl acetate and ethyl acetate of an origin other than that described.

The following example of an experiment will serve to illustrate the invention further without limiting it in any way.

EXAMPLE

A liquid mixture consisting of vinyl acetate and ethyl acetate with an ethyl acetate content equal to 0.4% by weight is distilled.

This mixture has been obtained in processes in which ethylene is oxidised with oxygen in the presence of a catalytic mixture comprising salts, particularly chlorides, of palladium, copper and alkali metals in liquid acetic acid. For fractionation, a column of the tray type is used with a diameter equal to 25 mm. and having thirty theoretical trays. At a point corresponding to the tenth theoretical tray from the bottom of the column, 763 g. per hour of the aforedescribed liquid mixture is continuously supplied while at a point corresponding to the twenty-fifth theoretical tray, ethylene glycol in quantities equal to 460 g. per hour is supplied. Distillation is carried out with a reflux ratio equal to 5, with a temperature at the bottom of the tower of 106 to 108° C. and with a temperature at the top of the tower of 66° C.

Under the conditions described, vinyl acetate is separated at the top of the tower and contains less than 200 p.p.m. ethyl acetate.

At the base of the column, the glycol is separated, together with ethyl acetate with just traces of vinyl acetate.

As noted, the column used in the method of the invention preferably has 30 to 50 theoretical trays. The trays are numbered from the bottom of the column, as is conventional in the art.

Both the mixture and glycol are fed to plates or trays intermediate between the bottom and top trays, the glycol being fed at a location above the feed point of the mixture. The mixture is preferably fed at the 5th to 30th tray, it being understood that the selected tray is still intermediate, i.e. not the topmost tray in the column, said selected tray being also below the tray to which glycol is fed.

Similarly, the glycol is preferably fed at the 20th to 40th tray, provided the selected tray is not the topmost one and is located above the tray to which the mixture is fed.

We claim:
1. A method for the separation of vinyl acetate from liquid mixtures with ethyl acetate, comprising:
    introducing said mixtures into a distillation columns at a point intermediate between the top of the distillation column and the bottom of the distillation column;
    supplying ethylene glycol and/or propylene glycol to the distillation column at a point intermediate the point of introduction of the liquid mixture and the top of the distillation column;
    separating vinyl acetate from ethyl acetate by an extractive distillation wherein the weight ratio of vinyl acetate: ethylene glycol and/or propylene glycol is 0.03:1 to 2:1 and with a reflux ratio of from 2 to 7;
    recovering vinyl acetate at the top of the distillation column; and
    recovering ethyl acetate and ethylene glycol and/or propylene glycol at the base of the distillation column.

2. A method according to claim 1 wherein the distillation column is a tray column with from 30 to 50 theoretical trays.

3. A method according to claim 2 wherein ethylene glycol and/or propylene glycol is supplied to the distillation column at a point below the top tray of the distillation column.

4. A method according to claim 2 wherein said mixture is introduced above the fifth theoretical tray.

5. A method according to claim 4 wherein the distillation column has more than 30 theoretical trays, and said mixture is introduced into the distillation column below the thirtieth theoretical tray.

6. A method according to claim 2 wherein the ethylene and/or propylene glycol is supplied to the distillation column at a point above the tenth theoretical tray.

7. A method according to claim 6 wherein the distillation column has more than 40 theoretical trays, and the ethylene and/or propylene glycol is supplied to the distillation column at a point below the fortieth theoretical tray.

References Cited
UNITED STATES PATENTS

| | | | |
|---|---|---|---|
| 2,636,050 | 4/1953 | Hoaglin et al. | 260—499 |
| 3,591,463 | 7/1971 | Copelin | 203—71 |
| 3,394,057 | 7/1968 | Miller | 203—71 |
| 3,458,406 | 7/1969 | Fisher et al. | 203—Dig 10 |

WILBUR L. BASCOMB, Jr., Primary Examiner

U.S. Cl. X.R.

203—64, DIG 10; 260—499